Figure 1:
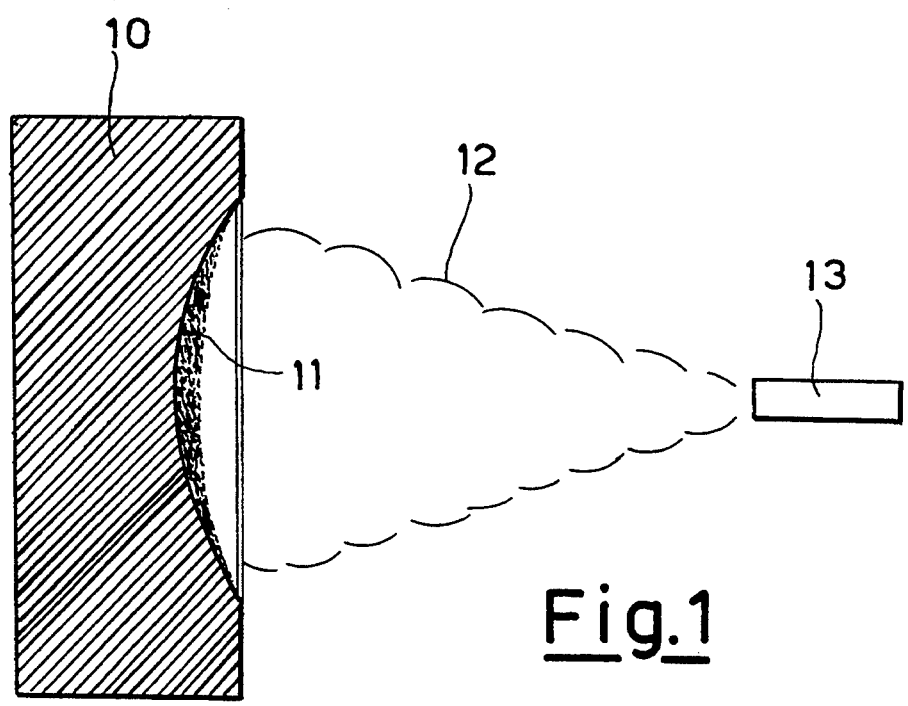

United States Patent [19]

Lauri

[11] Patent Number: 5,336,694
[45] Date of Patent: Aug. 9, 1994

[54] EXPANDED POLYMER PRODUCT WITH HIGH DISTORTION TEMPERATURE, HIGH FLAME RESISTANCE AND LOW SMOKE TOXICITY AND OPACITY

[75] Inventor: Leone Lauri, Ponte Nelle Alpi, Italy
[73] Assignee: Prima, S.p.A., Venice, Italy
[21] Appl. No.: 980,426
[22] Filed: Nov. 23, 1992

Related U.S. Application Data

[63] Continuation-in-part of Ser. No. 703,156, May 20, 1991, abandoned.

[30] Foreign Application Priority Data

May 22, 1990 [IT] Italy ................... 20397 A90

[51] Int. Cl.$^5$ ................... C08J 9/10
[52] U.S. Cl. ................... 521/92; 521/94; 521/139; 521/145
[58] Field of Search ............ 521/139, 145, 94, 92

[56] References Cited

U.S. PATENT DOCUMENTS

| | | | |
|---|---|---|---|
| 2,576,749 | 11/1951 | Carpentier | 521/94 |
| 2,769,804 | 11/1956 | Hanson | 260/86.7 |
| 2,971,939 | 2/1961 | Baer | 260/45.5 |
| 3,200,089 | 8/1965 | Landler et al. | 521/145 |
| 3,256,217 | 6/1966 | Landler et al. | 521/145 |
| 3,267,051 | 8/1966 | Landler et al. | 521/145 |
| 3,283,043 | 11/1966 | Landler et al. | 521/145 |
| 3,290,262 | 12/1966 | Leclercq | 521/145 |
| 3,336,267 | 8/1967 | Zimmerman et al. | 260/78.5 |

OTHER PUBLICATIONS

Modern Plastics Encyclopedia, 1989 pp. 118–127, 136–138 and 166–170.
Lacovyl TM Brochure; Atochem, elf aquitaine.

*Primary Examiner*—Morton Foelak
*Attorney, Agent, or Firm*—Hedman, Gibson & Costigan

[57] ABSTRACT

An expanded polymer product with high distortion temperature, high flame resistance and low smoke toxicity and opacity comprises, in combination:
- between 18% and 25% of a mixture of at least two isocyanates;
- between 8% and 11% of a styrene and maleic anhydride mixture;
- between 19% and 42% of a PVC resin in emulsion form;
- between 4% and 7% of at least one expanding agent;
- between 0.5% and 1% of at least one temperature stabilizer;
- between 16% and 40% of $TiO_2$.

Said product is used particularly in sea, ground and air transport, and in numerous constructional applications in which the materials must combine high technical characteristics with adequate lightness.

5 Claims, 1 Drawing Sheet

EXPANDED POLYMER PRODUCT WITH HIGH DISTORTION TEMPERATURE, HIGH FLAME RESISTANCE AND LOW SMOKE TOXICITY AND OPACITY

The present application is a continuation-in-part of application, Ser. No. 07/703,156 that was filed on May 20, 1991, now abandoned.

This invention relates to an expanded polymer product or material with high distortion temperature, high flame resistance and low smoke toxicity and opacity.

In constructing structures used in sea, ground or air transport, and in numerous other constructional applications, there is an increasing industrial demand for new materials offering lightness, high technical characteristics and a competitive price. In recent times there has been an acceleration in the passage from heavy metals to light metals, to solid plastics and finally to lightened plastics (sandwich structures).

There has therefore been an increase in resources directed towards the discovery of new composites, with a strong development in the techniques for constructing sandwich composites. This is not only due to the requirement for weight reduction with its consequent considerable advantages (reduction in installed power, greater self-sufficiency, reduced energy consumption) but is also for safety reasons.

In this respect it has been noted, for example in means of transport with light alloy structures, that if a fire occurs on board the heat propagation is so rapid as to result in the destruction or breakdown of the means of transport in such a short time as not to allow adequate intervention. It has been shown for example that an aluminium panel must have a thickness of at least 6.35 mm to satisfy FAA requirements. An aluminium panel 3.17 mm thick used as the ceiling in a compartment section subjected to a flame resistance test melted in about 11 minutes, with the result that the fire could not be contained or extinguished within its starting compartment by consuming the oxygen contained in it. One of the most well known expanded materials used as a core for sandwich structures in the aeronautical sector is PMI (polymethacrylimide).

This product has mechanical characteristics suitable for withstanding an industrial production cycle at 106° C., and as it can be worked at relatively high temperature and pressure it is compatible with carbon, graphite and boron-reinforced resin systems using epoxy or imide resins, such as bismaleimide (BMI), for which ageing at +180° C. is necessary.

A big drawback of expanded PMI is that the material is very hygroscopic and hence susceptible to moisture absorption and weight increase. If the panel is exposed to a temperature exceeding 120° C. an expansion-deformation takes place due to the increase in volume of the water vapour locked in the cell. This characteristic is not always negative and can be utilized during production, however this expansion can continue for days after the production cycle, causing distortion of the final product.

Moreover, when expanded PMI undergoes a sandwich production cycle with prepreg sheets (pressure 1 bar/cm$^2$, temperature 125° C. for 90 minutes) it changes its physical configuration and tends to lose its initial elasticity to a very substantial extent, until it becomes almost pulverulent if subjected to any abrasive rubbing.

Finally, expanded PMI is very costly in relation to its density and type.

A second product widely used in the American aeronautics industry is a particular type of polyurethane. Polyurethanes are used as materials for the final sealing of the edges of honeycomb sandwich panels for passenger cabin walls and partitions, for the upper containers, for drink trolleys and for toilet walls.

Polyurethanes are friable and hygroscopic and do not have the separation resistance of other materials. In addition, these expanded products commonly have dimensional Instability at +82° C., and during combustion produce toxic smoke. Furthermore, polyurethanes do not have the strength of other core materials.

Polyurethanes are known to be the cheapest available core material for high temperature gluing. Thirdly there are the honeycomb core materials, including paper, phenolic resin-impregnated paper, carbon, glass fibres, aluminium, titanium and others. They represent at least 80% of the core materials used in aerospace applications.

Largely on account of its hexagonal cell configuration, a honeycomb has the greatest strength per unit of mass.

The cost of these materials varies from a few cents per board foot to a very high cost for more complex materials such as a graphite honeycomb filled with carbon/acrylic foam. Most honeycomb materials are hygroscopic and can produce blisters during polymerization.

Although polyurethane foams and honeycomb materials have all these defects, they are still used because at the moment there are no other materials able to replace them with advantage.

In this respect, a material suitable for use in the aforesaid fields must be able to withstand an industrial production cycle without its initial physical characteristics and in particular its elasticity changing, under either compression, shear, tension or flexure. In addition the material must satisfy the latest requirements in terms of flame resistance, smoke opacity, smoke toxicity and heat emission in case of combustion.

The required characteristics are specifically:
high mechanical strength at a temperature of 125°/180° C.
high resistance to dynamic force
good elasticity on impact
low density
thermal insulation
non-hygroscopic
isotropy
low heat emission in case of fire
low smoke toxicity
low smoke opacity
preservation of these characteristics with time.

The main object of the present invention is to provide an expanded polymer product having all the aforelisted characteristics. This object is attained according to the present invention by an expanded polymer product characterised by comprising, in combination:
between 18% and 25% of a mixture of at least two organic isocyanates;
between 8% and 11% of a styrene maleic anhydride mixture;
between 19% and 42% of a PVC (polyvinyl chloride) resin in emulsion form;
between 4% and 7% of at least one expanding agent;

between 0.5% and 1% of at least one temperature stabilizer;

between 16% and 40% of $TiO_2$.

Preferably said mixture of at least two isocyanates comprises toluenediisocyanate, hexamethylenediisocyanate and/or methylenebisphenylisocyanate. Preferably said styrene and maleic anhydride mixture is comprised from about 10-90 percent styrene and about 90-10 percent maleic anhydride, preferably from about 30-70 percent styrene and about 70-30 percent maleic anhydride.

Preferably said at least one expanding agent comprises azodiisobutyronitrile and azodicarbonamide. Preferably said at least one temperature stabilizing agent comprises tribasic lead sulphate, tribasic lead phthalate and dibasic lead phosphite.

The $TiO_2$ is futile.

Preferably said PVC resin in emulsion form is that known commercially as LAVCOVYL-EF 821, available from Ugine Kuhlmann, Paris France or Atochem which is a high molecular weight vinyl chloride homopolymer manufactured by emulsion polymerization process for the preparation of plastisols. Preferably the polyvinyl chloride resin is a fine powder, a mass volume of approximately 0.35-0.40, approximately viscosity of 190-205, a K-Value (Din 53726) approximately 86, and a pH of approximately 7.5. It is believed the average particle size of the polyvinyl chloride resin in emulsion form has an average particle size of about 1 to about 10 microns. A general description of the polyvinyl chloride resin can be found on pages 118-127 of 89 *Modern Plastics Encyclopedia*, Mid-October Issue 1988, incorporated herein by reference.

In a preferred embodiment of the present invention, about 18 to about 25 percent by weight of at least two diisocyanates, preferably selected from toluenediisocyanate, hexamethylenediisocyanate and methylenebisphenylisocyanate; about 8 to about 11 percent by weight of a styrene and maleic anhydride mixture, preferably comprising [a mixture of maleic anhydride and styrene with] about 30 to about 70 percent by weight of the mixture comprising maleic anhydride and about 70 to about 30 percent by weight of the mixture comprising styrene; about 19 to about 42 percent by weight of a polyvinyl chloride resin in emulsion form; about 4 to about 7 percent by weight of an expanding agent, preferably azodiisobutyronitrile or azodicarbonamide; about 0.5 to about 1 percent by weight of a temperature stabilizer, preferably tribasic lead sulphate, tribasic lead phthalate or dibasic lead phosphite; and 16 to 42 percent by weight of $TiO_2$ are mixed together to form the expanded polymer product.

The applicant does not wish to be limited by any particular theory but it is believed that the expanded polymer product is formed when the expanding agent, such as azodiisobutyronitrile, decomposes under certain pressures and temperatures, commonly known to those skilled art (see generally, 89 *Modern Plastics Encyclopedia, Mid-October Issue* 1988, pages 166-170, which is hereby incorporated by reference), to create free radicals. The styrene and maleic anhydride mixture copolymerizes under the free radical conditions created by the decomposition of the expanding agent. The copolymerization of the maleic anhydride and styrene are generally described in U. S. Pat. Nos. 2,971,939, 3,336,267 and 2,769,804 which are hereby incorporated by reference. The copolymer formed from the styrene and maleic anhydride mixture under free radical conditions is grafted onto the polyvinyl chloride thereby producing the expanded polymer product of the present invention.

It is further believed that the diisocyanates are foamed under conditions known in the art (see generally, 89 *Modern Plastics Encyclopedia*, Mid-October 1988, pages 136-138, which is hereby incorporated by reference) and fill the cells created by the terpolymer.

The term "PVC resin in emulsion form" as used in this specification is intended to refer to the particular size of the polymer particles, which constitute the polyvinyl chloride resin.

The product of the invention can be prepared for example by using the process teachings contained in the patents FR 1,266,487, 1,256,549, 946,720, 946,719 and IT 446,572.

In this manner an expanded cellular material is obtained having a density varying from a minimum of 25 $kg/m^3$ to a maximum of 700 $kg/m^3$.

Its cell structure is very fine and uniform:

that of density 25 $kgm^3$ has a minimum cell number of 25,000 per cm3 that of density 700 $kgm^3$ has a minimum cell number of 300,000 per cm3 percentage of closed cells: 100%.

The very fine cell structure ensures regular formation of the protective carbon screen when the material is exposed to a flame. Passage from the "as such" state to the formation of the "carbon screen" takes place without flame emission.

The novelty and originality of the product is that although being highly filled, it continues to possess mechanical characteristics typical of unfilled expanded materials, and that on exposure to fire it presents unique attitudes, in particular when the $TiO_2$ (titanium dioxide) filler present in a quantity of 35/40% by weight becomes particularly reactive on temperature increase. On exposing the expanded material to the high flame temperature (about 1000° C.), rapid thermal decomposition of the formulation PVC takes place, this already at 200° C. being transformed into carbon and releasing $Cl^-$ (nascent chlorine) and $H^+$ (nascent hydrogen), these as soon as they are formed being in intimate contact with the $TiO_2$, which is also at high temperature.

It is in this stage that the $TiO_2$, from 500° C. onwards in the presence of red hot carbon and chlorine ($Cl^- + Cl^- = Cl_2$) is converted into $TiCl_4$ (titanium tetrachloride). However in the presence of $H^+$, $TiCl_4$ is converted into $TiCl_3$ (gaseous titanium trichloride), this being a smokeless gas which is energetically reducing.

The reducing action of $TiCl_3$ is also exhibited on the $TiO_2$ still present in the mass, to remove its oxygen so converting it into Ti, i.e. titanium metal, which because of its extreme reactivity reacts immediately with any substance with which it comes into contact. As there is an abundance of hot carbon, TiC (titanium carbide) forms, this melting only at 3050° C.

In this first stage, the following processes occur:
1) The PVC present in the formulation offers no fire protection and rapidly decomposes into carbon, $Cl^-$ and $H^+$.
2) The $TiO_2$ is converted into $TiCl_4$ (titanium tetrachloride) in the presence of hot carbon and chlorine ($Cl_2$).
3) The $TiCl_4$ is converted into $TiCl_3$ (gaseous titanium trichloride) in the presence of $H^+$.

4) The $TiCl_3$, which is an energetic reducing agent, reacts with the $TiO_2$ still present to deprive it of oxygen and hence convert it into titanium metal.

5) The titanium metal is converted into TiC (titanium carbide).

At this point we have the following conditions or second stage.

1) Instead of the decomposed PVC present in the formulation, a spongy layer forms which is compact by reinforcement by the residual excess $TiO_2$ filler (initially uniformly dispersed within the expanded mass).

2) The same layer also comprises the titanium carbide which together with the $TiO_2$ gives this layer a particular protective action against heat transmission, which is considerably reduced for the following reasons:

a) sufficient layer cohesion and uniformity to oppose the flame mechanical action, which is unable to remove this layer which therefore acts as a "true protective screen" for the underlying integral material;

b) the low thermal conductivity of the protective screen (0.08 cal/cm.sec. °C.) prevents the flame heat from raising the temperature of the underlying material in a relatively short time, so preserving it from further decomposition.

In practice the situation represented in FIG. 1 of the accompanying drawing has been verified, in which 10 indicates the integral base material, 11 the protective screen formed as a consequence of the reaction between the raw materials of the base material and 12 the flame of a burner 13.

In confirmation of the aforestated, on conducting combustion tests on this product in accordance with Federal Air Regulations and ATS 1000.001 (on a standard ⅛" thick sample) under the two standard non-flaming and flaming conditions, the following volume losses were noted:

a) Non-flaming: 13%
b) Flaming: 35–40%

Mechanical Resistance to Temperature

The distortion temperature of this material is 150° C. according to DIN 53424 for a density up to 80 kg/m$^3$ and 160° C. for a density between 90 kg/m$^3$ and 700 kg/m$^3$.

Only an expanded material having this mechanical resistance to temperature can withstand current prepreg production cycles, and for the highest densities (from 100 kg/m$^3$ to 700 kg/m$^3$) it can withstand industrial processing cycles comprising pressures exceeding 1 bar/cm2 and temperatures of 160°–180° C. for a time of between 15 and 90 minutes.

Thermal Insulation

As is well known, the thermal conductivity coefficient varies with density, this product having a thermal conductivity of 0.022 Kcal/mh° C. at 20° C. (according to ASTM 518) for the minimum density of 25 kg/m$^3$, 0.024 kcal/mh° C. for a density of 100 kg/m$^3$, and 0.055 kcal/mh° C. at 20° C. for a density of 700 kg/m$^3$. The significant "non-variation" with time of these thermal conductivity coefficients arises from the special production process for this material.

Water Absorption

Independently of the product density, the water absorption is less than 0.01 g/cm$^3$ based on ASTM C272.

Smoke Optical Density

As stated, in the case of fire, this product passes from the "as such" state to the formation of the "carbon screen" without emitting flame, only smoke being emitted. The optical density of the emitted smoke is less than 200 after 4 minutes, and the maximum degree of heat emitted after 5 minutes is less than 65 kW/m$^2$.

Toxicity of the Emitted Gases in Case of Fire

On the basis of the Federal Air Regulations and ATS 1000.001 the quantity of toxic gases emitted in case of combustion expressed in ppm after 4 minutes of exposure to the flame is as follows:

Hydrocyanic acid (HCN) less than 70 ppm
Hydrochloric acid (HCl) less than 100 ppm
Hydrofluoric acid (HF) absent
Sulphur dioxide ($SO_2+H_2S$) absent
Nitrogen oxides ($NO+NO_2$) less than 15 ppm.

Particular attention has been given to drastically reducing the emission of the "invisible odourless killer gas" carbon monoxide (CO).

The currently allowable limit is 3500 ppm after 4 minutes, whereas this product after 4 minutes has a maximum emission of less than 400 ppm.

General Characteristics

In addition to the aforegoing, this product has the following characteristics:

a) excellent elasticity, which makes it suitable for use in structures which have to withstand high stresses or impact b) excellent adhesive capacity and compatibility with most of the currently used adhesives and sheets (in sandwich constructions)

c) thermoformable, it being able to assume the most diverse shapes d) non-friable e) unattackable by bacteria, insects or rodents f) resistant to hydrocarbons, acids and alkalis, and to the solvents present in polyester and vinylester resins.

Of particular importance is the unalterability of the product physical structure on exposure, including very long exposure, to ultraviolet rays, and good transparency to radio and radar signals.

The object stated in the introduction to the description is thus attained.

The above mentioned patents, publications and test methods are incorporated herein by reference.

What is claimed is:

1. An expanded polymer product characterized by comprising in combination:

between 18% and 25% of a mixture of at least two organic diisocyanates;

between 8% and 11% of a styrene and maleic anhydride copolymer;

between 19% and 42% of a polyvinyl chloride resin in emulsion form;

between 4% and 7% of at least one expanding agent;

between 0.5% and 1% of at least one temperature stabilizer;

between 16% and 49% of $TiO_2$.

2. A product as claimed in claim 1, characterised in that said mixture of at least two diisocyanates comprises toluenediisocyanate, hexamethyllenediisocyanate and/or methylenebisphenylisocyanate.

3. A product as claimed in claim 1, characterised in that said at least one expanding agent comprises azodiisobutyronitrile and azodicarbonamide.

4. A product as claimed in claim 1, characterised in that said at least one temperature stabilizing agent comprises tribasic lead sulphate, tribasic lead phthalate and dibasic lead phosphite.

5. A product as claimed in claim 1, characterised in that the $TiO_2$ is futile.

* * * * *